(12) United States Patent
Milliner

(10) Patent No.: US 7,484,475 B2
(45) Date of Patent: Feb. 3, 2009

(54) COLLAPSIBLE ANIMAL FEEDER

(76) Inventor: Richard C. Milliner, 8029 Adelaine Dr., Columbus, GA (US) 31909

( * ) Notice: Subject to any disclaimer, the term of this patent is extended or adjusted under 35 U.S.C. 154(b) by 239 days.

(21) Appl. No.: 11/595,105

(22) Filed: Nov. 10, 2006

(65) Prior Publication Data

US 2007/0144445 A1    Jun. 28, 2007

Related U.S. Application Data

(60) Provisional application No. 60/736,069, filed on Nov. 10, 2005.

(51) Int. Cl.
*A01K 5/00* (2006.01)

(52) U.S. Cl. .................... 119/52.1; 119/52.2
(58) Field of Classification Search ............. 119/52.1, 119/51.01, 52.2, 52.3, 61.5, 57.91, 57.9, 119/429, 430, 431, 61.31, 461, 498; 220/8
See application file for complete search history.

(56) References Cited

U.S. PATENT DOCUMENTS

| | | | | |
|---|---|---|---|---|
| 1,790,045 | A * | 1/1931 | Dow ................ | 119/52.1 |
| 2,789,534 | A * | 4/1957 | Landgraf ........... | 119/52.1 |
| 2,880,902 | A | 4/1959 | Owsen | |
| 2,941,506 | A | 6/1960 | Fulton | |
| 4,204,500 | A * | 5/1980 | Podjan ............... | 119/57.8 |
| 4,624,382 | A | 11/1986 | Tontarelli | |
| RE32,379 | E * | 3/1987 | Touzani ............. | 215/372 |
| 4,974,265 | A * | 12/1990 | Maggio ............. | 4/449 |
| 5,699,753 | A | 12/1997 | Aldridge | |
| 5,862,932 | A * | 1/1999 | Walsh et al. ....... | 220/8 |
| 6,047,661 | A | 4/2000 | Lush | |
| 6,073,582 | A | 6/2000 | Lush | |
| 6,427,629 | B1 | 8/2002 | Lush | |
| 6,866,004 | B1 | 3/2005 | Lush | |
| 7,028,635 | B1 * | 4/2006 | Eastman, II ........ | 119/51.11 |
| 7,032,538 | B1 * | 4/2006 | Lush ................. | 119/52.1 |
| 7,185,605 | B1 * | 3/2007 | Lush ................. | 119/52.2 |
| D544,303 | S * | 6/2007 | Strepkoff ........... | D7/512 |

OTHER PUBLICATIONS

Web Page from www.tecomate.com showing the Tecomate Hurricane 225 tripod suspended, collapsible feeder. Date of Dowload Nov. 10, 2006.
Web Page from www.cabelas.com showing additional details of the Tecomate Hurricane tripod suspended, collapsible feeder. Date of Dowload Nov. 10, 2006.
Enlarged Photograph of Tecomate Hurricane tripod suspended, collapsible feeder shown at www.cabelas.com. Date of Dowload Nov. 10, 2006.

* cited by examiner

*Primary Examiner*—Yvonne R. Abbott

(57) ABSTRACT

An animal feeder is provided that includes a collapsible feedbox and a base for resting on a predetermined surface. The feedbox is configured to collapse as feed is distributed from the feeder. The feedbox is configured to collapse as the feed level is depleted thereby providing a visual indication of the feed levels within the feedbox.

16 Claims, 20 Drawing Sheets

(FULLY COLLAPSED)

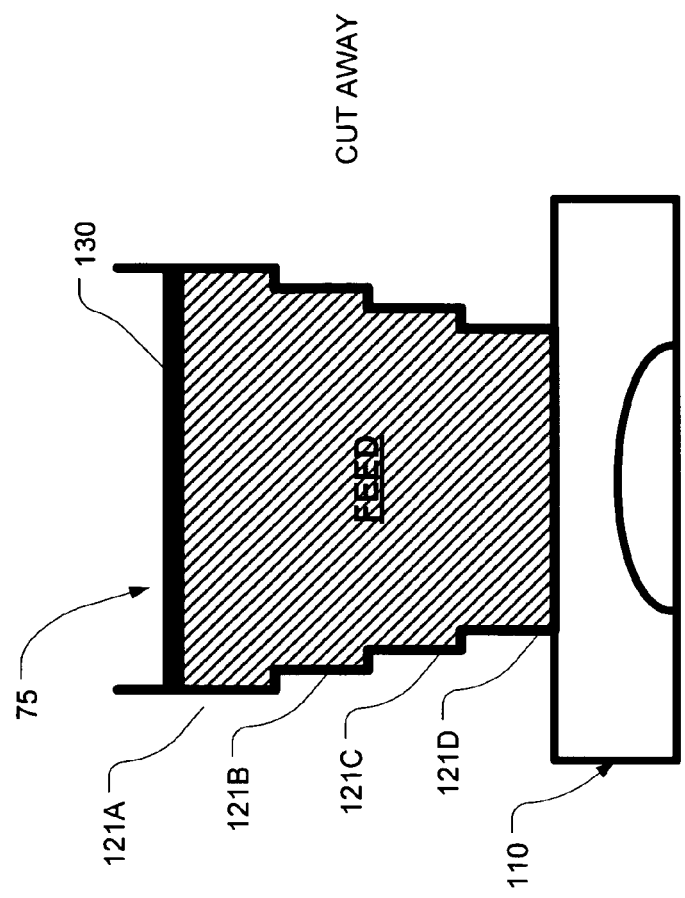
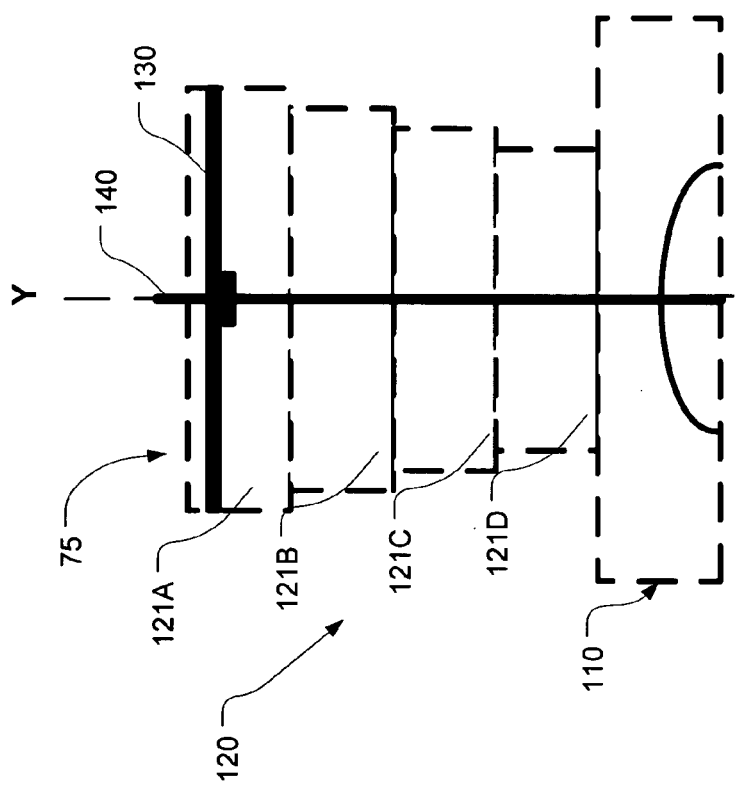

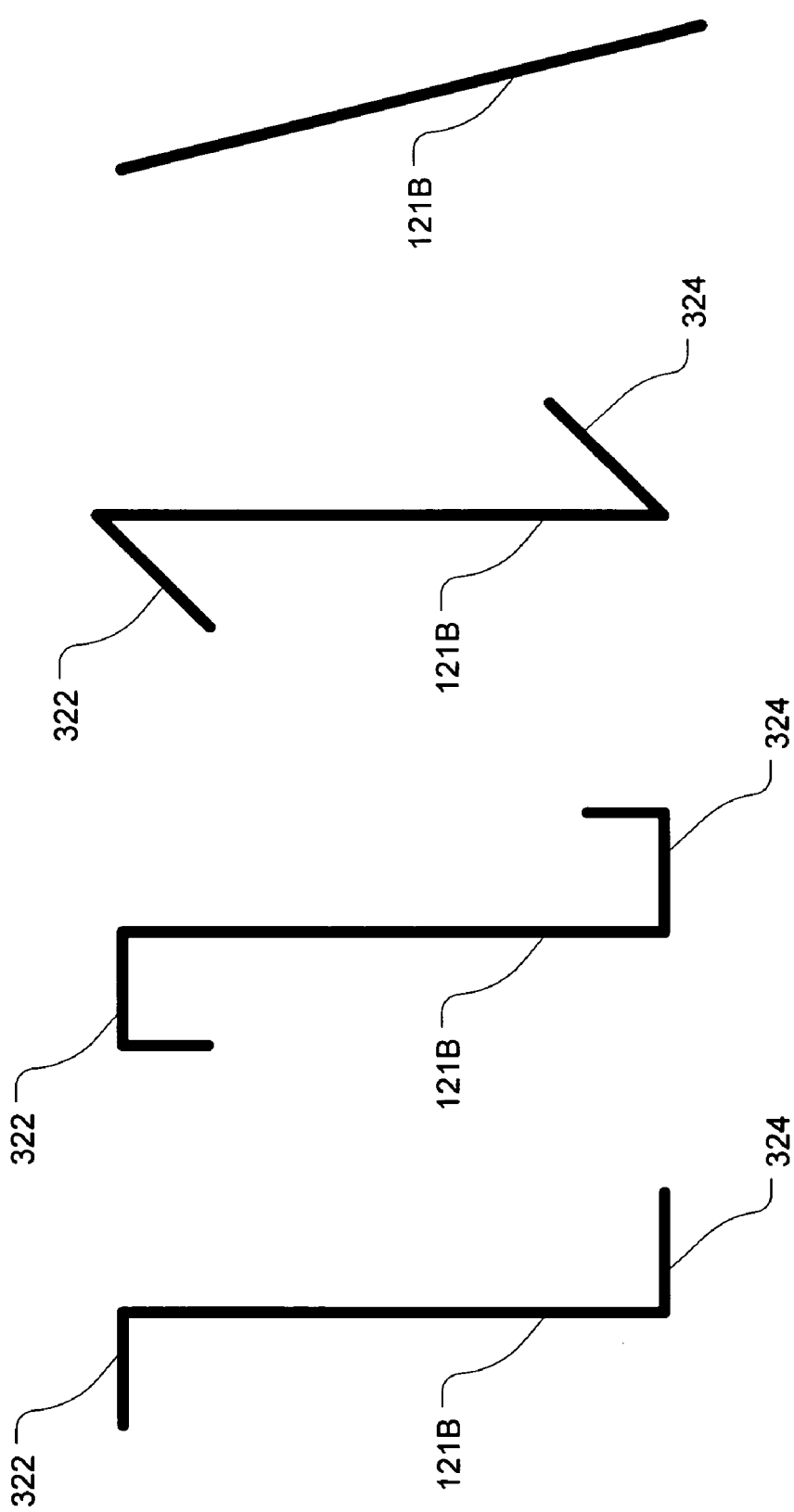

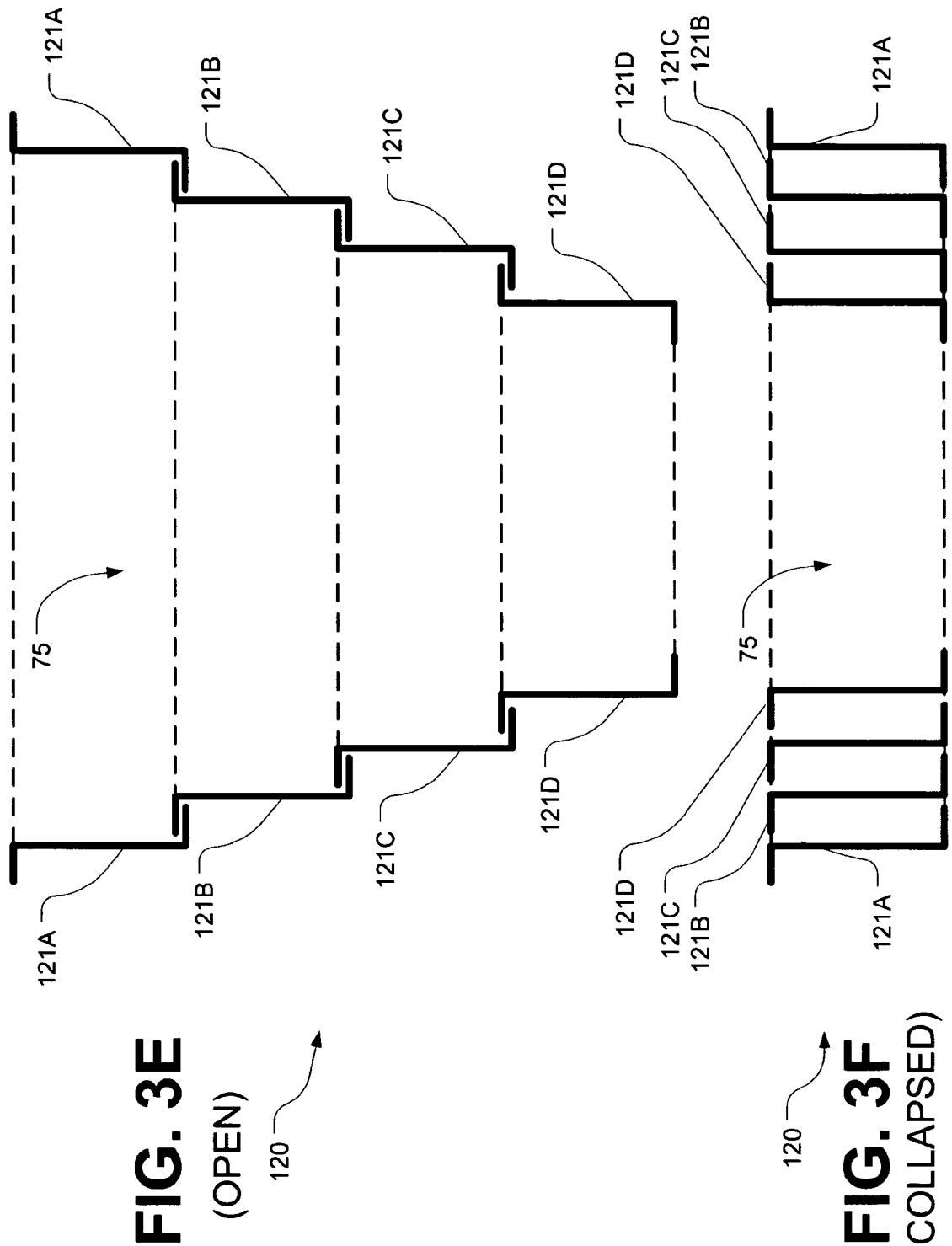

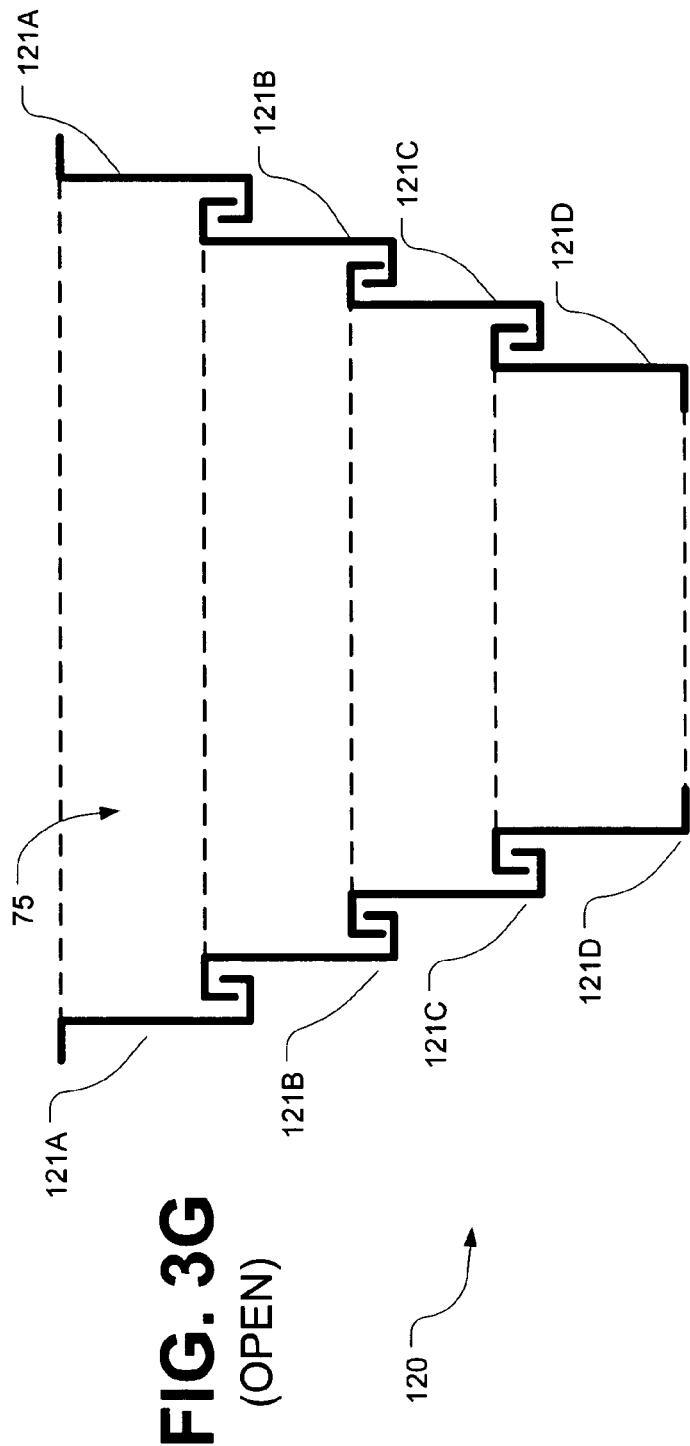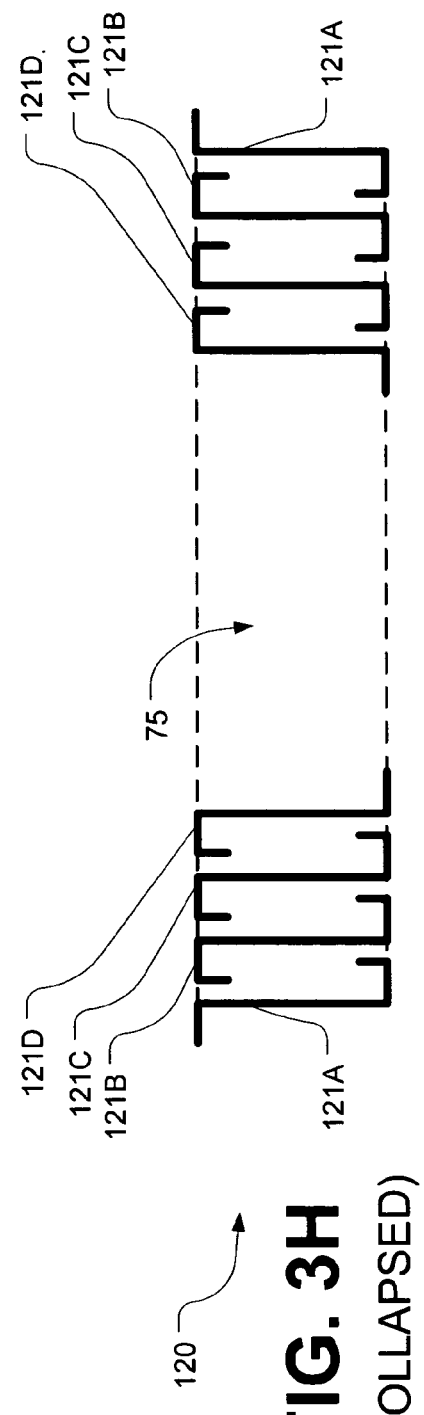
FIG. 3G (OPEN)
FIG. 3H (COLLAPSED)

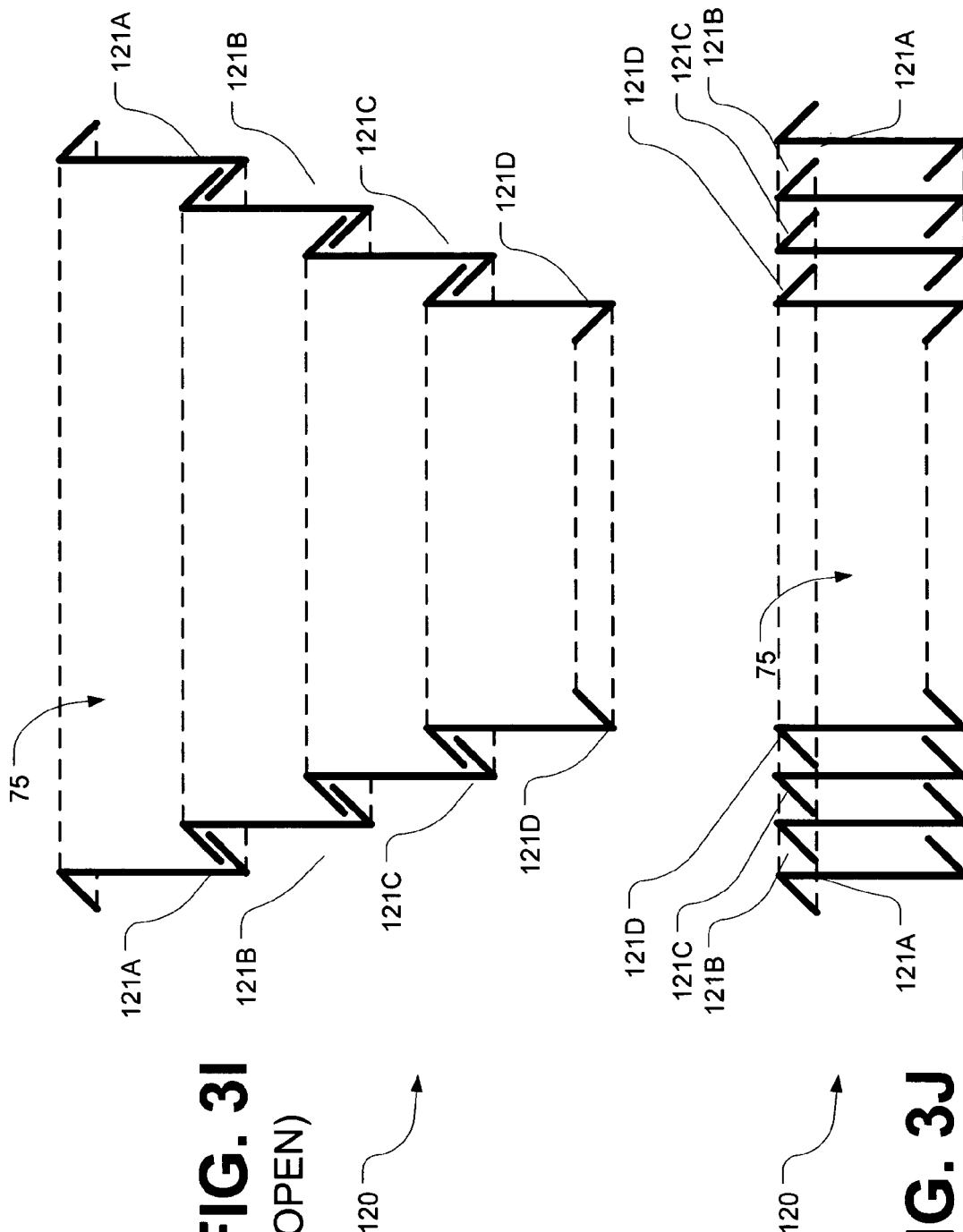

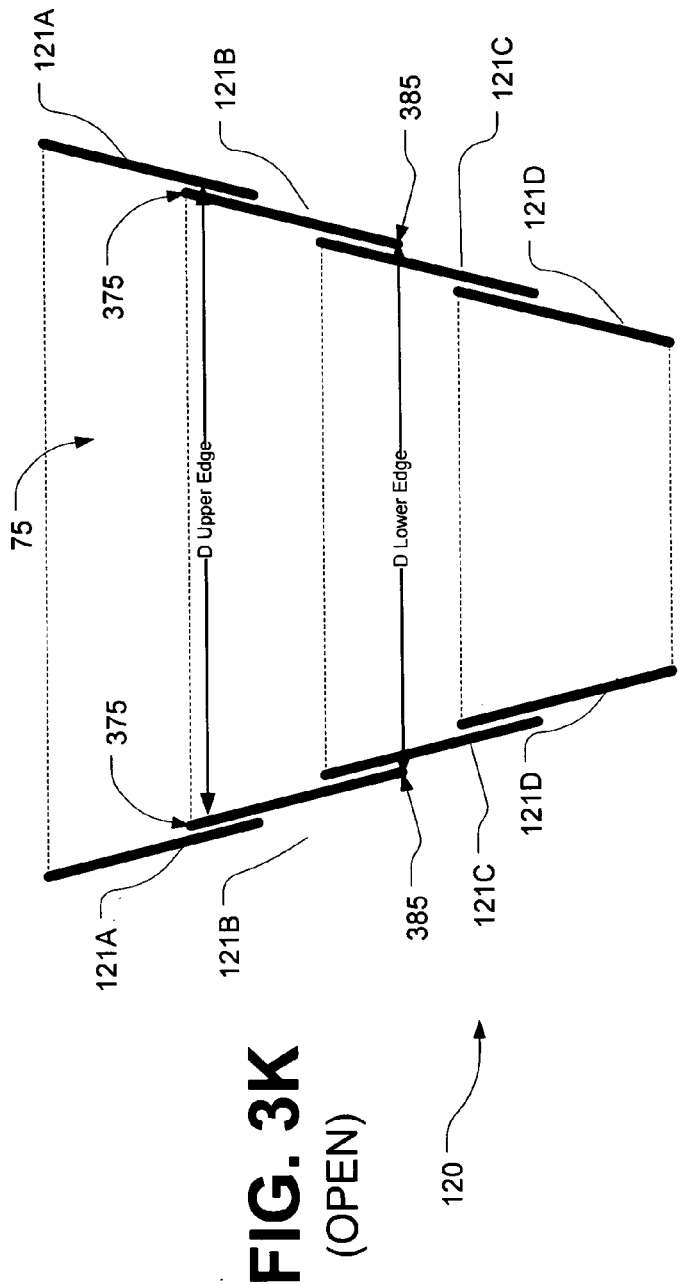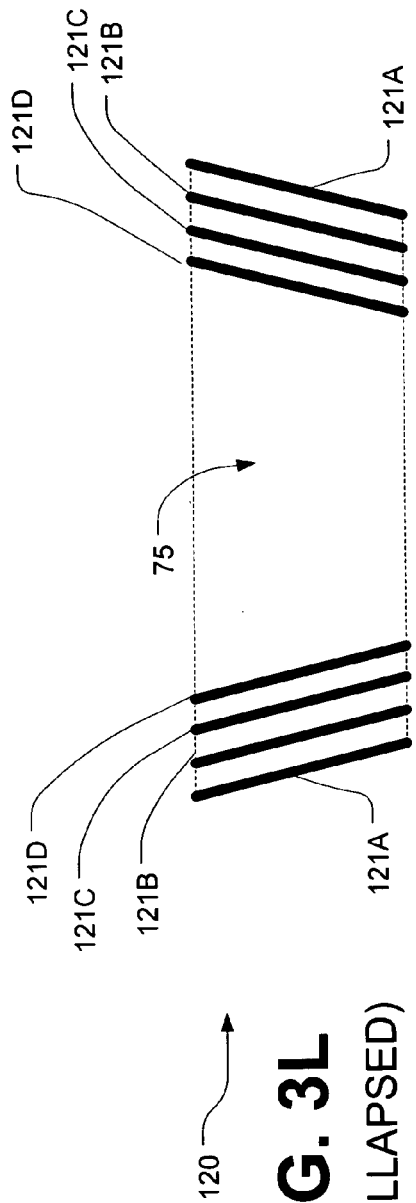
FIG. 3K (OPEN)
FIG. 3L (COLLAPSED)

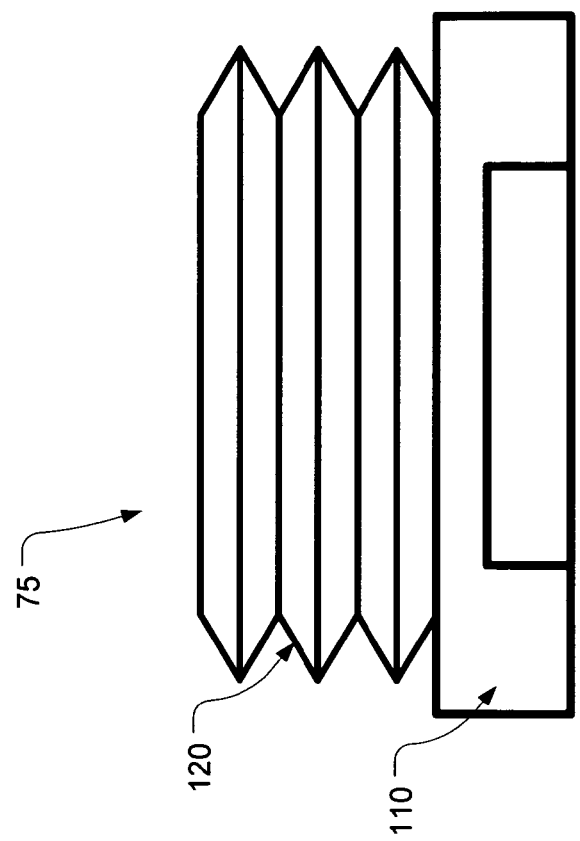
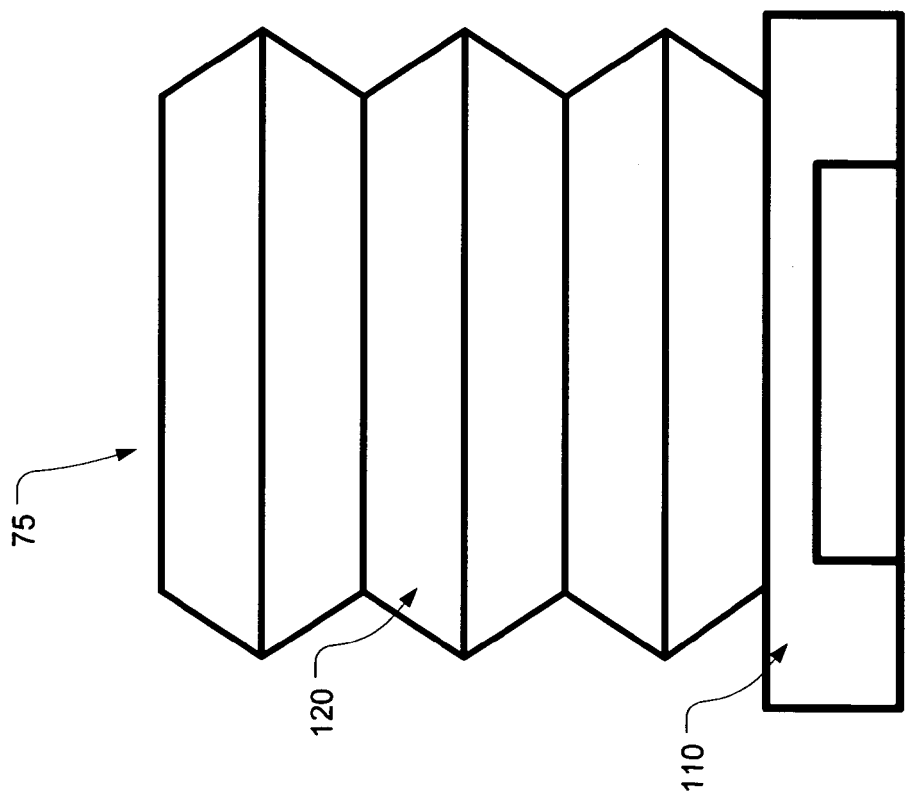

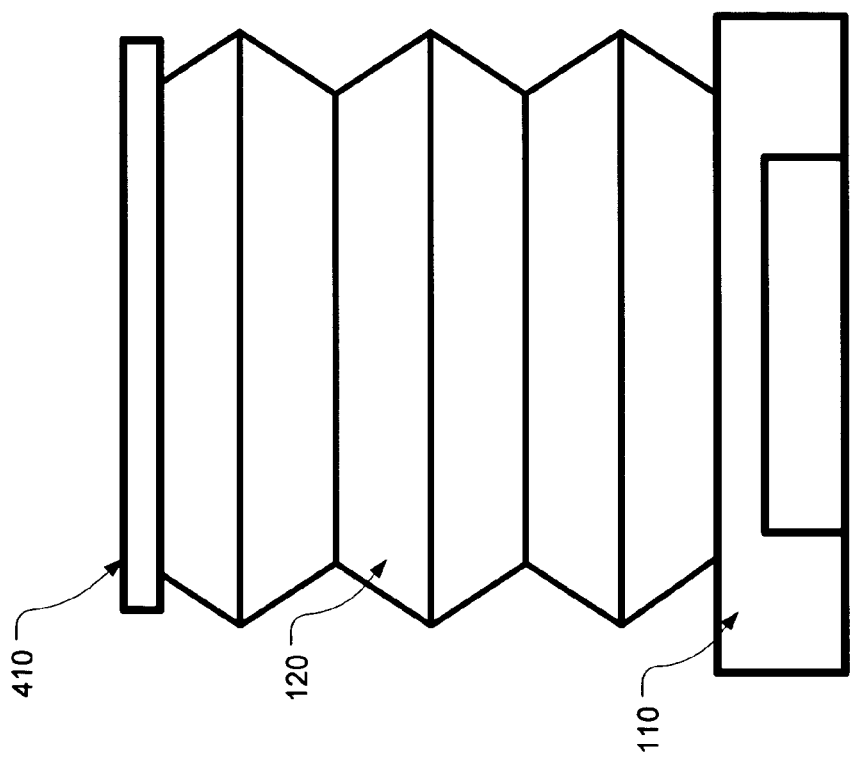
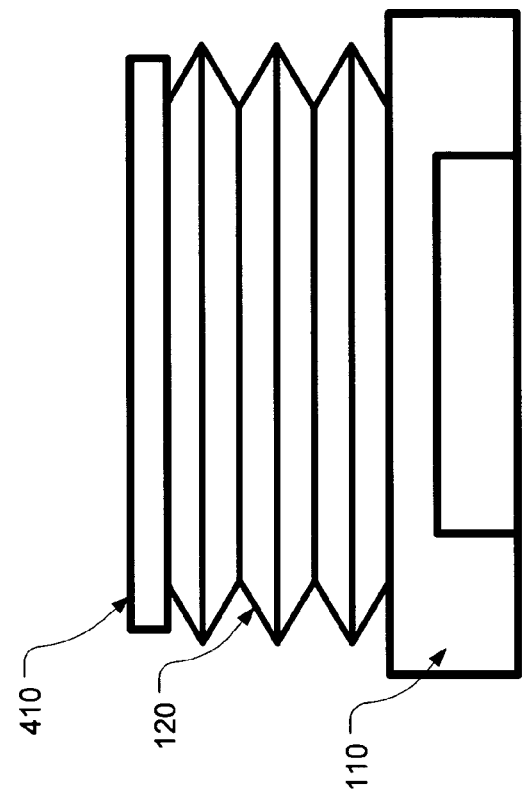
FIG. 4E
FIG. 4F

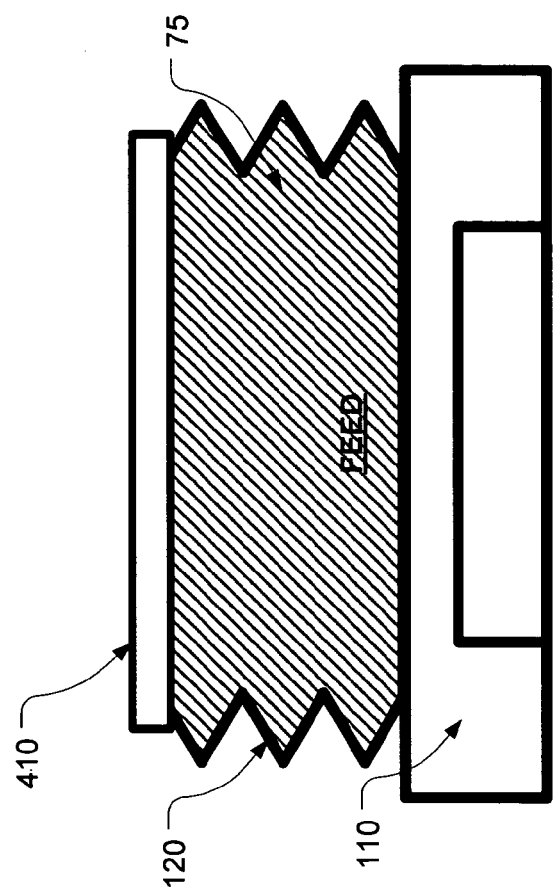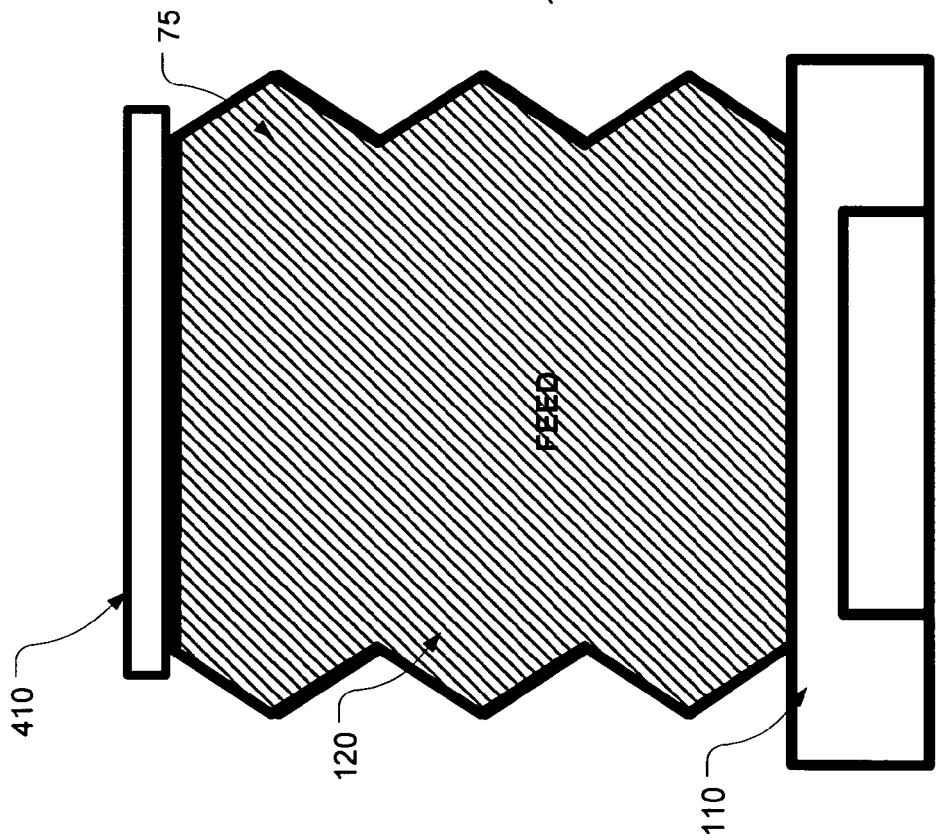
FIG. 4H
FIG. 4G

COLLAPSIBLE ANIMAL FEEDER

CROSS-REFERENCE TO RELATED APPLICATION(S)

This application claims priority with respect to U.S. Provisional Application having Ser. No. 60/736,069 filed on Nov. 10, 2005 the disclosure of which is hereby incorporated herein by reference.

TECHNICAL FIELD OF THE INVENTION

The present invention is generally related to animal feeders. More particularly, the present invention is directed to a collapsible animal feeder.

BACKGROUND

Supplemental feeding of wild game has become a common practice among outdoorsmen. In an effort to improve animal health as well as animal numbers, more and more people who hunt have engaged in supplementing the normal food sources found in the wild. By providing feed such as various grains and minerals year-round, numerous species of animals can be attracted to an area (feeding site).

Animal feeders are commonly used by outdoorsmen to distribute feed to attract wild game into a particular outdoor area. These animal feeders must typically be transported to the feeding site and set-up. Often times an outdoorsman will place more than one feeder to cover a particular hunting area. Larger or more bulky feeders are more inconvenient to use, as they require vehicles with substantial capacity to transport or more than one trip to move to a feeding site of interest. During the period of time that the animal feeder is being used, the user must regularly re-visit the feeding site to monitor food levels and replenish animal feed as needed. Once on site, in order to determine the status of the feed supply contained in the animal feeder, the user must often remove the covers or hatches or other parts of the animal feeder, or otherwise partially disassemble the animal feeder, in order to conduct a visual inspection of the feed storage compartment of the animal feeder.

Wild game animals are very sensitive to smells and can easily detect the scent of a human being. Typically, when a wild game animal does detect the scent of a human its' natural response is to flee and stay away from the area in which the scent was detected. For this reason, it is in the outdoorsman's best interest to have as little contact with the animal feeder and/or the area where the animal feeder is located.

A number of known animal feeders exist. These feeders are designed to hold and distribute animal feed at a given feeding site over a period of time typically defined by how long the animal feed supply lasts. In order to avoid a user having to make frequent trips to the feeder to refill its contents, typical feeders are configured to be large enough to hold enough feed to last a extended period of time. As result, they are large and bulky and typically difficult to transport. They also require substantial amount of space to store when the feeder is not in use.

The typical feeder has no provisions for perpetual dispensing of feed. Thus it is necessary for a user to replenish the feeder with animal feed on a regular basis. This requires the user to visit the feeding site at which the animal feeder is located to see if the animal feeder is running low or has run out of animal feed supply.

Supplemental feeding of wild game has become a common practice among outdoorsmen. In an effort to improve animal health as well as increase animal numbers, more and more people who hunt are engaged in supplementing the normal food sources for animals found in the wild. By feeding various grains and minerals year-round, numerous species of animals can be attracted for hunting purposes.

In order to carry out supplemental feeding of wild game, numerous known feeding devices have been proposed. These feeding devices include gravity feeders, trough feeders and tripod feeders.

Gravity Feeders typically include a large container that includes one or more openings at or near the bottom of the container. Feed is placed into the container where in then is free to pass down thru the opening and out onto the ground where it is accessible to wildlife. Some examples of gravity type feeders have been described in U.S. Pat. No. 2,941,506 to Fulton. These feeders are typically large and bulky and band not easy to transport, move or otherwise store. Further, in order to determine when feed needs to be replenished, it is necessary to visit the feeding site of the feeder to make visual inspection at close range. This may also require at least partial disassembly of the feeder in order to access the fill holes.

Trough Feeders are typically configured as an open tub or trough like container that is placed on or above the ground and in a position that makes feed placed in the trough easily accessible to wildlife. In order to keep the feed dry, trough like feeders may provide for a shelter structure, such as, for example, a roof to shield the trough from rain and other elements. In order to provide enough feed for wildlife, the trough must be configured of sufficient size. This typically translates into a large and bulky structure that is not easy to transport, move or otherwise store. Further, in order to determine when feed needs to be replenished, it is necessary to visit the feeding site of the trough to make visual inspection at close range.

Tripod or Suspended Feeders typically include a drum-like container that is attached to, and supported at a predetermined level above the ground, by a tripod or other support system. The drum like container typically includes a hole near the bottom of the container that allows feed to pour from the container and onto a spinner plate. The spinner plate can be activated by a timed, motorized system so as to rotate the spinner plate for a predetermined period of time. When the spinner plate rotates, any feed on the plate is tossed from the spinner plate and onto the ground within a predetermined radius of the feeder. The timed distribution of feed aids the conditioning of wild life to feed when the feed is available. The motorized system is typically powered via a battery system which requires periodic replacement/recharging. These types of feeders are typically suspended at least eight feet in the air so as to maximize the area that can be covered by the feeder when feed is spin from the spinner plate. Determining whether or not the drum of the tripod feeder needs to be replenished with feed typically requires that the outdoorsman climb to the top of the suspended drum and/or, to partially disassemble the feeder so that the drum may be lowered to the ground for inspection/replenishment.

SUMMARY OF THE INVENTION

The present invention is directed to an animal feeding device. More particularly, the present invention is related to a collapsible animal feeder.

In one implementation of the invention a feeder is provided that includes a collapsible feedbox that includes two or more concentric bands that are generally aligned along a common vertical axis. The feedbox is connected to a base that includes a feed outlet for outputting feed from the feedbox. In a further implementation a collapsible feedbox is provided that is configured as a unitary collapsible vessel.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2A-FIG. 2B are diagrams relevant to initial set up of the feeder device.

FIG. 3A-FIG. 3L are diagrams depicting various configurations of concentric bands that may be used to fabricate one implementation of feedbox 120.

FIG. 4A-FIG. 4H are diagrams depicting a further embodiment of feedbox 120.

DESCRIPTION OF THE INVENTION

Figure 1A:
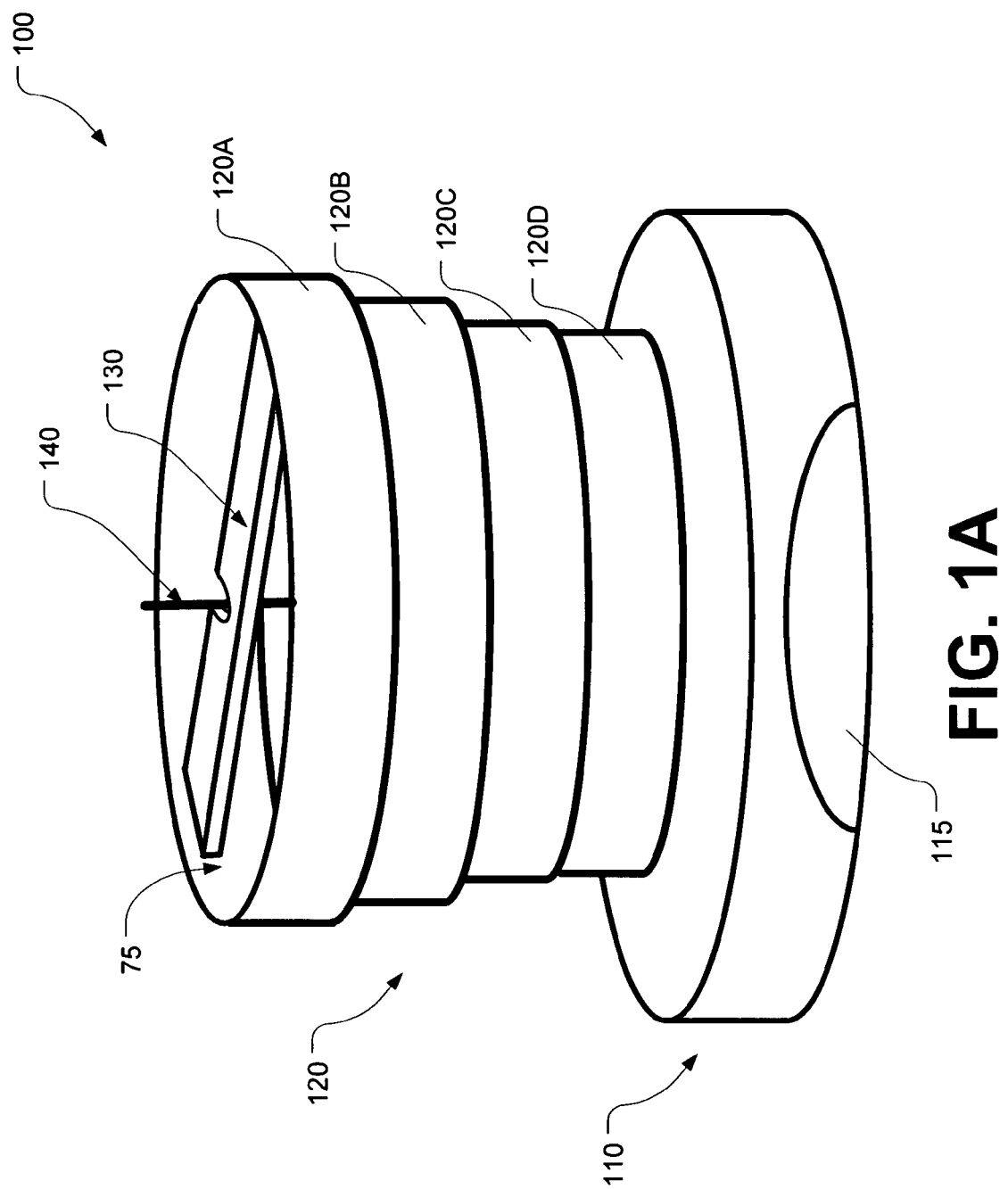
FIG. 1A-FIG. 1H are diagrams depicting one embodiment of the feeder device of the present invention.
Figure 1B:
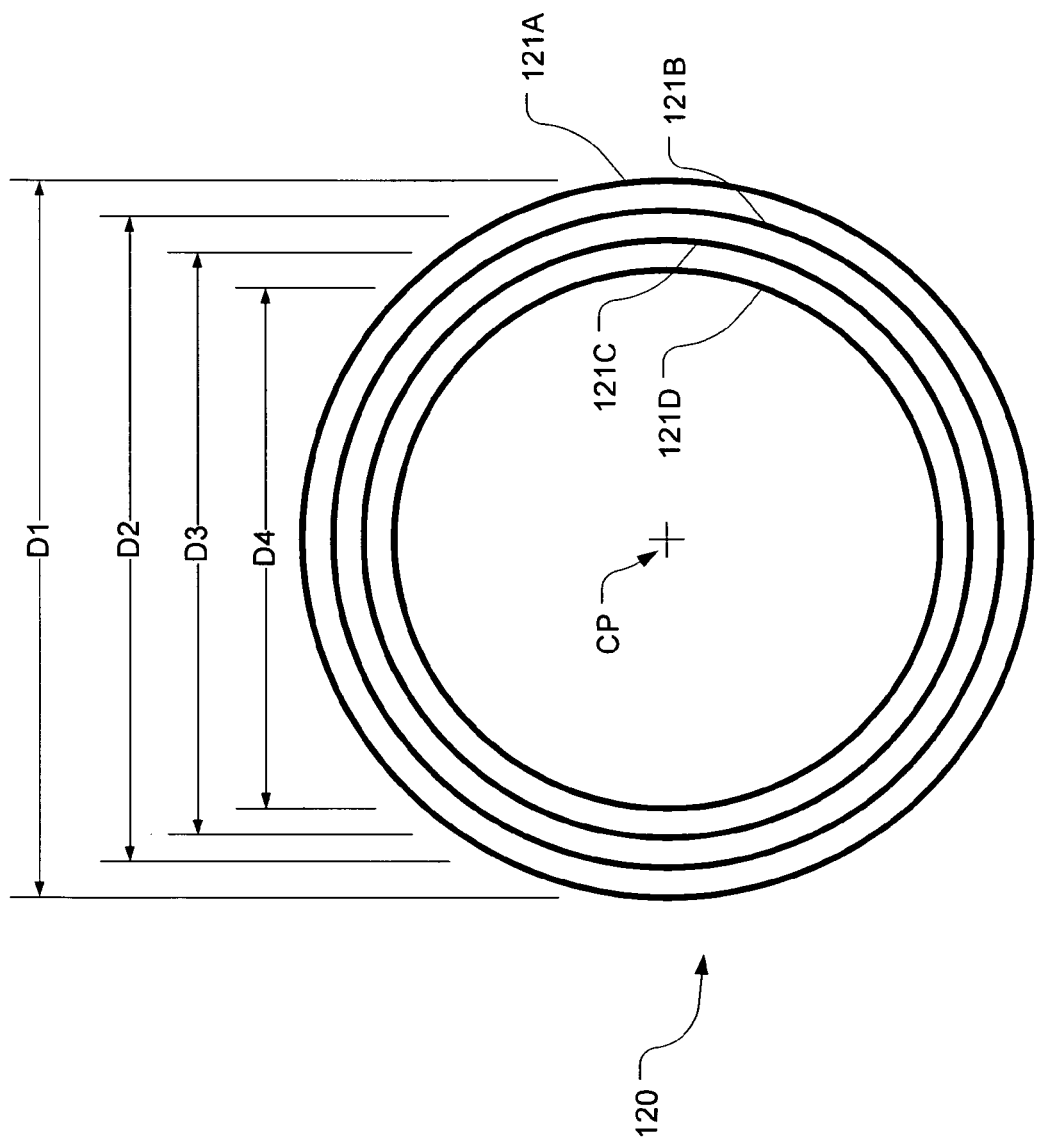

The present invention is directed to a feeder that includes a feedbox for holding animal feed. Feed is emptied from the feedbox by gravity on to, for example, the ground around the feeder. As feed is emptied from the feedbox, the feedbox collapses in height, thus providing a visual indication of the status of the feed levels within the feedbox. Further, by collapsing the feedbox after use, it is possible to be transport and store the feed in a smaller space than would be required to accommodate the size of the fully opened feeder.

One embodiment of the feeder is generally depicted in the attached figures FIG. 1A-FIG. 1F. In this embodiment of the feeder 100 there is provided a base 110, and collapsible feedbox 120 which defines a void 75 for containing feed. The base 110 includes a feed outlet 115 that allows feed to drop from the collapsible feedbox 120 and out so that wildlife can access and ingest it.

The collapsible feedbox 120 may be implemented in various ways. With reference to FIG. 1A and the top down view of feedbox 120 depicted in FIG. 1B, the feedbox 120 may be implemented as a series of concentric bands (cylinders) 121A-121D, each having different interior diameters D1-D4, that are nested together to form the feedbox 120. The center points (CP) of the interior diameters D1-D4 of the concentric bands 121A-121D are generally aligned along a common vertical axis "Y" (see FIG. 1C and FIG. 1E).

The edges of the concentric bands 121A-121D are configured to interface with each other so that as one band is raised upward, generally along the vertical axis "Y", the next smallest diameter band is pulled upwardly as well, thereby increasing the volume of void 75 while providing a generally solid enclosure for containing feed within the increased void 75. A cross member 130 is connected to the band 120A and extends generally across the diameter of the band 120A. The cross member 130 is preferably connected near the upper edge of the band 120A.

Figure 1C:
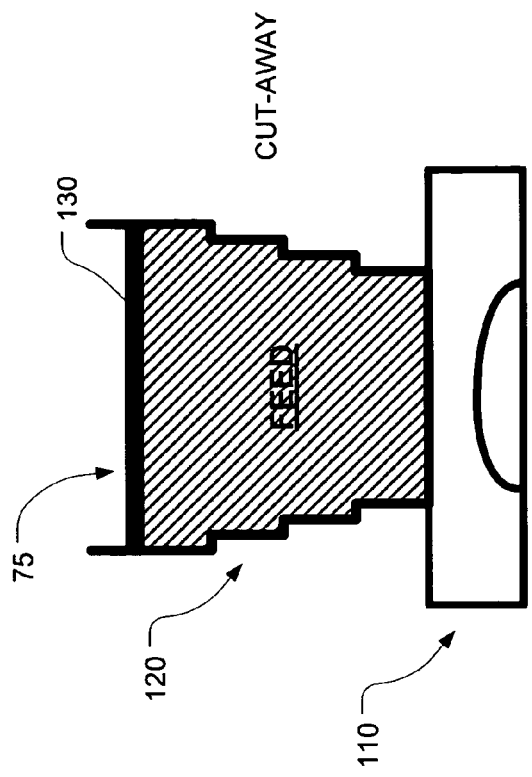

With reference to FIG. 1C, the feedbox 120 can be partially or fully opened by raising or expanding the concentric bands 121A-121D vertically upward along the vertical axis "Y". In this way the volume of the interior void 75 defined by the feedbox 120 is increased and the vertical height of the feedbox 120 is also increased. The greater volume of void 75 allows the feedbox 120 to accommodate larger amounts of feed.

Figure 1D:
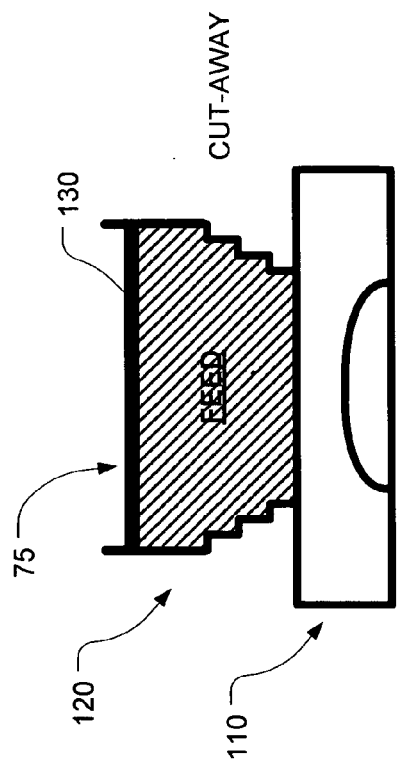

Similarly, as depicted in FIG. 1D the feedbox 120 can be partially or fully closed by dropping or compressing the concentric bands 121A-121D vertically downward along the vertical axis "Y". In this way the volume of the interior void 75 defined by the feedbox 120 is reduced and the vertical height of the feedbox 120 is also reduced.

Figure 1E:
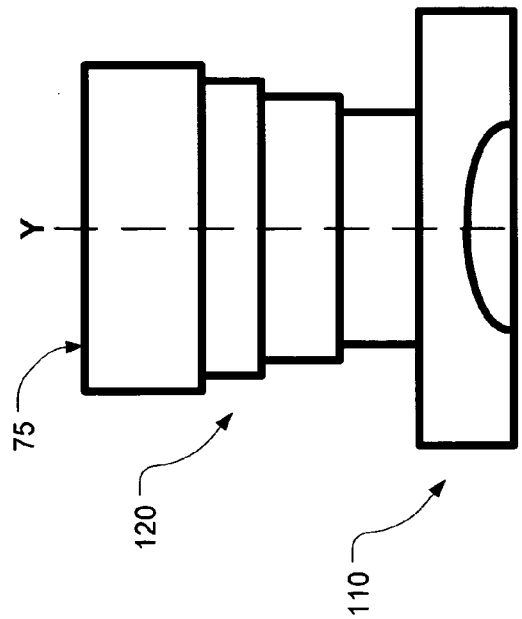
Figure 1F:
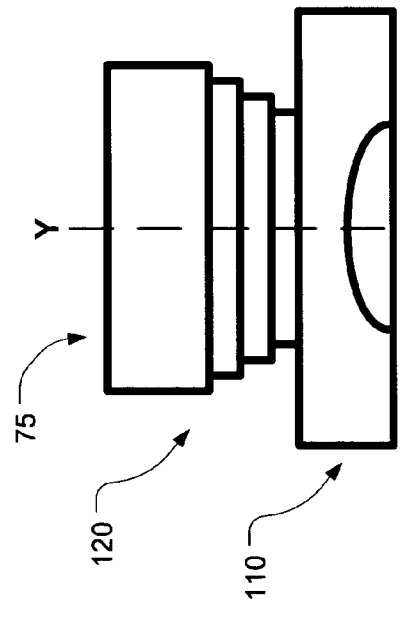

The cut away view of feedbox 120 depicted in FIG. 1E shows the feedbox 120 in a full open or near full open position in which the volume of void 75 is maximum or near maximum. FEED is placed into the void 75. As will be discussed further below, the FEED in the void 75 acts to support the cross member 130 and thus the bands 121A-121D. As the FEED is distributed from the feeder 100, the level of feed is reduced and the height of the feedbox 120 is also reduced. FIG. 1F depicts the feedbox 120 in a partially collapsed position in which the volume of the void 75 is less than maximum or near minimum. As the FEED level is at a reduced level the cross member 130 is supported by the feed at a height that is less than maximum, and thus the height of the feedbox 120 is also at a reduced, less than maximum height.

Figure 1G:
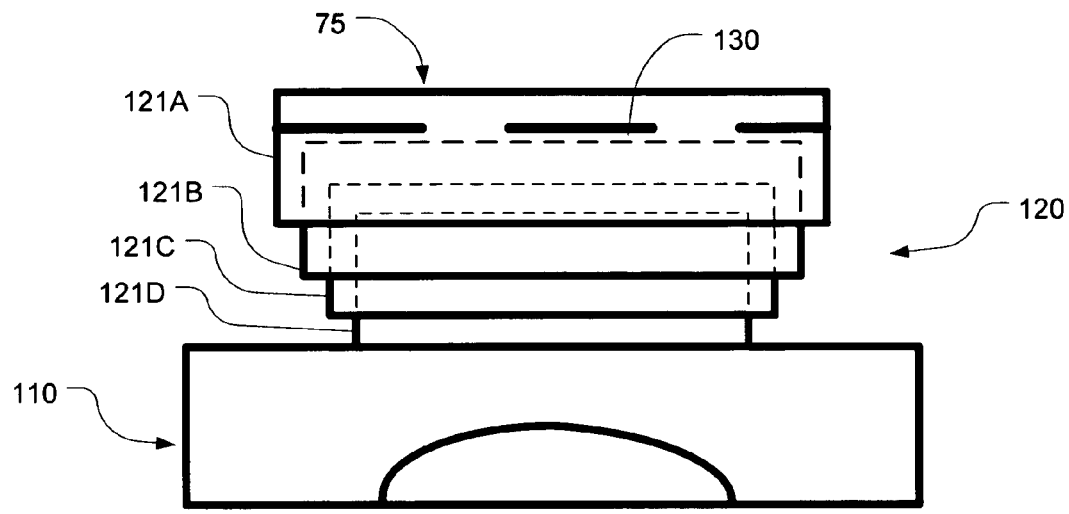
Figure 1H:
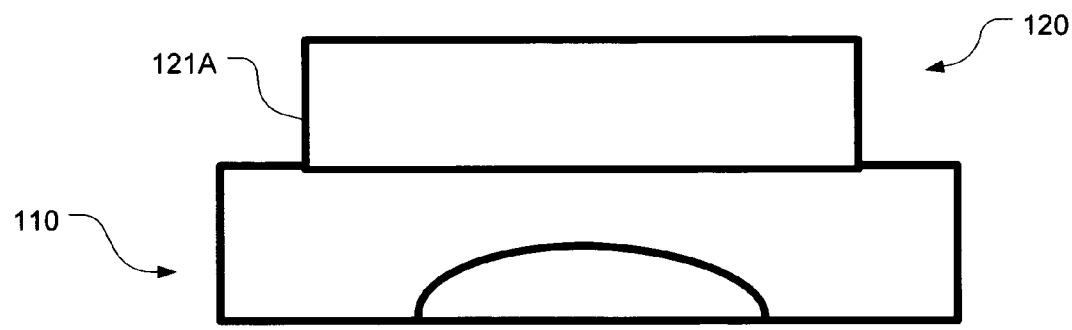

FIG. 1G is a diagram depicting a hidden view showing how the bands 121A-121D nest together as the height of the feedbox 120 moves toward minimum height. FIG. 1F is a diagram depicting a front view of the feeder 100 when the feedbox 120 is at a fully collapsed or minimum height position.

With reference to FIG. 2A and FIG. 2B the setup of the feeder 100 will be discussed. The feedbox 120 may be placed into an operating position by raising the concentric bans 121A-121D from a collapsed/nested position, vertically along the Y-axis. This increases the volume of the interior void 75 thus opening the feedbox 120 to receive feed.

Initial set up of the feeder 100 involves pulling the bands of feedbox 120 out/upward vertically generally along the Y-axis. Since the bands 121A-121D are subject to the effects of gravity without any external support, once the bands are raised to provide void 75 with the desired interior volume, a support rod 140 is temporarily placed generally parallel to or along the Y-axis, between the base 110 and the cross member 130. In this way the expanded feedbox 120 is held open so that feed may be placed into the void 75 of feedbox 120. Once the desired level of feed has been placed into the feedbox 120, the support rod 140 is removed and the concentric bands 121A-121D of feedbox 120 are allowed to fall/collapse downward until the cross member 140 is resting atop the feed that has been placed into the feedbox 120 as depicted in the diagram of FIG. 2B. In this way the feedbox 120 is held open and at a level sufficient to accommodate the feed remaining in the feedbox 120.

As feed is output via outlet 115 and eaten by wildlife, gravity causes more feed from the feedbox 120 to fall from the feedbox 120 and out via outlet 115. As the feed in the feedbox 120 decreases, the cross member 130 moves downward as the feed level is reduced. In this way, the bands 121A-121D move downward, thus reducing the vertical height of the feedbox 120. When the feedbox 120 is empty or near empty, the vertical height of the feedbox 120 will appear to be fully, or near fully, collapsed.

A mere visual inspection of the height of the feeder 100 will give an observer a quick indication of whether or not the feeder 100 needs to be restocked with feed. This visual inspection can be easily done at a distance via either direct vision or with the aid of an optical device such as binoculars, spotting scope or telescope. Allowing the status of feed levels to be determined at a distance helps to minimize the number of times human intrusions into the immediate area surrounding the feeder must be made to check/replenish feed supplies. By minimizing human intrusions into the feed site, the introduction/distribution of human scents within the immediate area surrounding the feeder 100 is also minimized, thus lessening the chances that wild animals will flee from the area of the feed site.

In one embodiment the upper and/or lower edges of the concentric bands 121A-121D are configured to include a flange along the upper and/or lower edges of the bands 121A-121D. These flanges are configured so that a flange on the lower edge of a larger diameter band will engage with a flange on the upper edge of an adjacent smaller diameter band when the larger band is raised vertically upward to open the feedbox 120. The flanges located along the upper edge of a band are preferably configured to extend outward away from the interior void 75 of the feedbox 120, while a flange located along the lower edge of the band are preferably configured to extend inward toward the interior void 75 of feedbox 120.

FIG. 3A-FIG. 3D are diagrams depicting various ways of configuring a flange along the upper and/or lower edges of the bands 121A-121D. In this diagram, band 121B is shown for purposes of illustration. It will be understood, however, that the same principles are equally applicable to any one or more of the bands 121A, 121C and 121D. In this embodiment the band 121B is configured to include an upper flange 322 disposed along or near the upper edge of band 121B. A lower flange 324 is also disposed along or near the lower edge of the band 121B.

In one embodiment depicted in FIG. 3A, FIG. 3E and FIG. 3F the upper flange 322 is generally perpendicular to the band 121B and extends outward away from the interior void 75. The lower flange 324 is also generally perpendicular to the band 121B and extends inward toward the interior void 75. FIG. 3E shows the interaction/relation of flanges 322 and 324 of the various bands 121A-121D when the feedbox 120 is substantially open or fully expanded. FIG. 3F shows the interaction/relation of flanges 322 and 324 of the various bands 121A-121D when the feedbox 120 is substantially closed or fully collapsed.

In another embodiment depicted in FIG. 3B, FIG. 3G and FIG. 3H the upper flange 322 is similar to that described in connection with FIG. 3A however it is turned downward at the end to provide for a generally "L" shaped flange that extends from along or near the upper edge of the bans 121B. Similarly, the lower flange 324 is similar to that described in connection with FIG. 3A however it is turned upward at the end to provide for a generally "L" shaped flange that extends from along or near the lower edge of the ban 121B. FIG. 3G shows the interaction of flanges 322 and 324 of the various bands 121A-121D when the feedbox 120 is substantially open or fully expanded.

In a further embodiment depicted in FIG. 3C, FIG. 3I and FIG. 3J the upper flange 322 is similar to that described in connection with FIG. 3A however it is angled downward from along or near the upper edge of the bans 121B. Similarly, the lower flange 324 is similar to that described in connection with FIG. 3I however it is angled upward from along or near the lower edge of the ban 121B. FIG. 3J shows the interaction of flanges 322 and 324 of the various bands 121A-121D when the feedbox 120 is substantially open or fully expanded.

In a further embodiment depicted in FIG. 3D, FIG. 3K and FIG. 3L the band 121B is angled so that the diameter of the upper edge 375 of the band 121B is greater than the diameter of the lower edge 385 of the band 121B. Further, in order to engage with adjacent bands, the diameter of the upper edge is configured to be less than the diameter of the lower edge of the adjacent larger band. Additionally, the diameter of the lower edge of the band 121B is configured to be greater than the diameter of the upper edge of the adjacent smaller band. FIG. 3K and FIG. 3L illustrate the interaction/relation between the bands 121A-121D when the bands are configured in this manner.

The interaction between the bands 121A-121D is important in that any space between the bands can act to allow feed to "leak" from the void 75 and out thru a space other than the feed outlet 115. It is preferable to minimize the "leakage" of feed thru the feedbox 120.

FIG. 4A-FIG. 4H are diagrams depicting a further embodiment of the feeder 100 in which the feedbox 120 is implemented as a unitary vessel that can be collapsed/compressed, in an accordion-like fashion, to yield a smaller volume void 75. In this embodiment, the vessel is generally cylindrical in shape. However the walls of the cylinder are formed in an accordion-like fashion. The vessel is preferably fabricated using flexible material such as, for example, plastic or rubber.

Figure 4A:
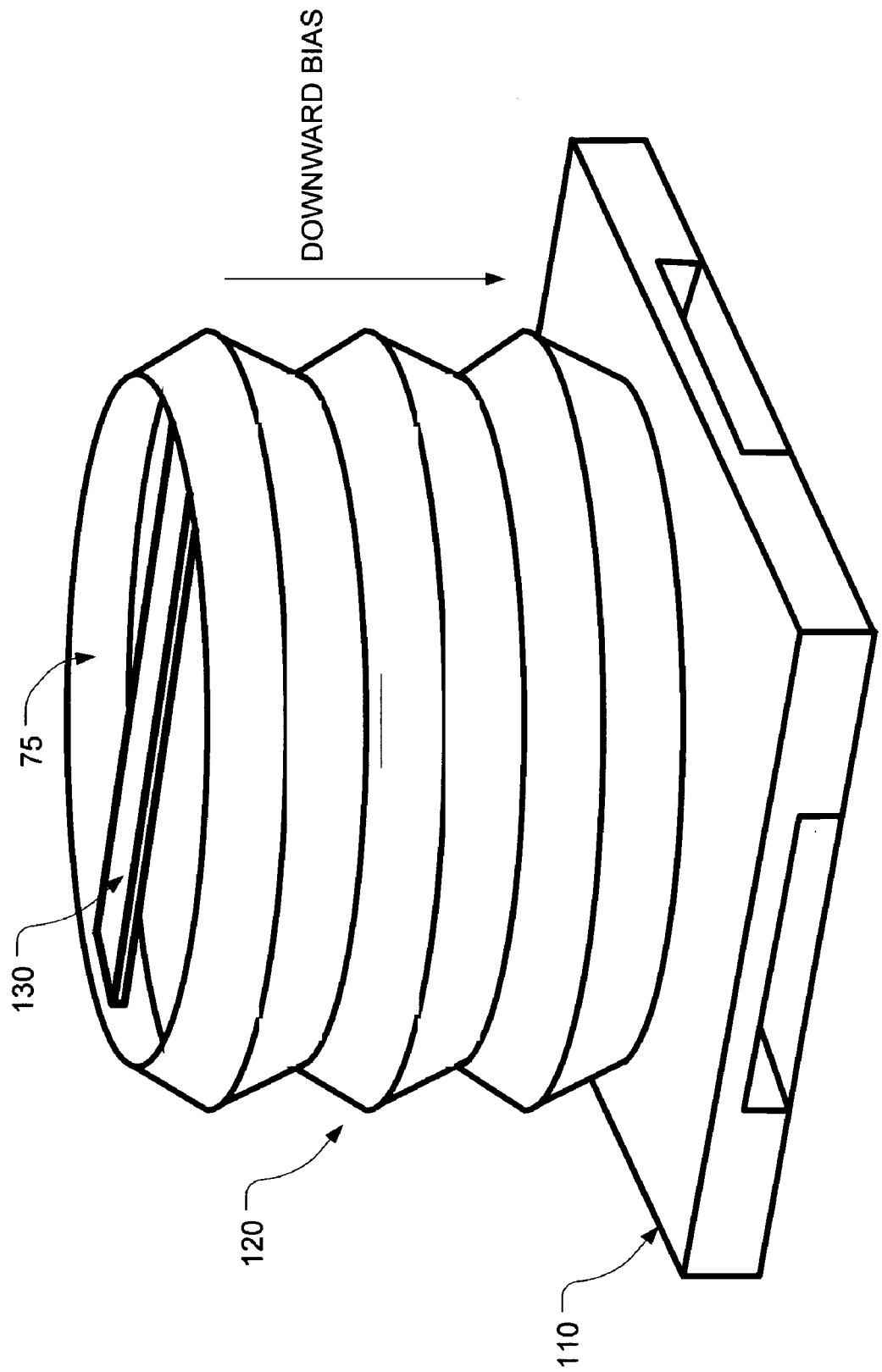
Figure 4D:
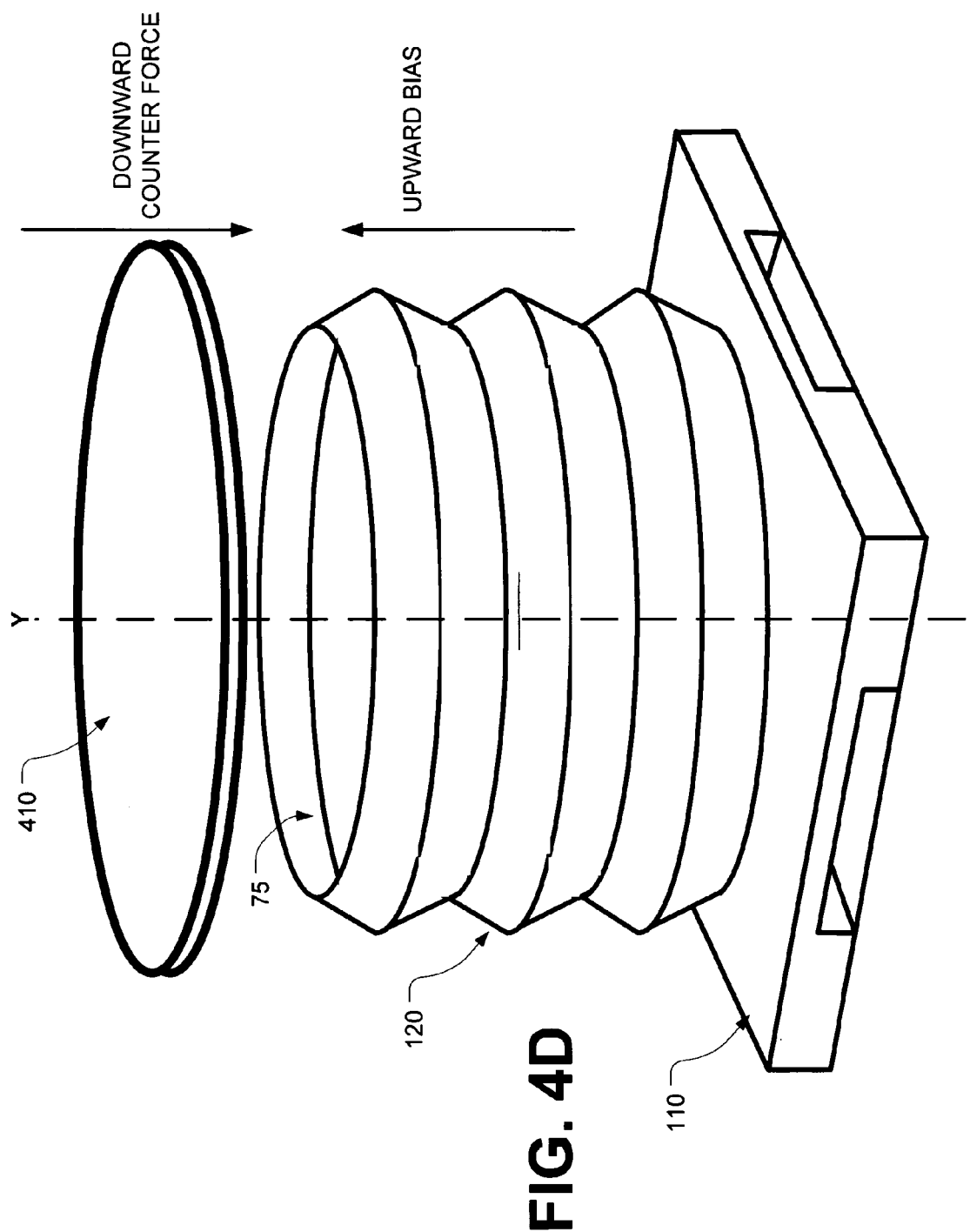

In one embodiment depicted by FIG. 4A-FIG. 4C, the accordion-like vessel (feedbox 120) is biased (downward bias) so that it naturally tends to collapse/downward along the vertical axis Y, toward a minimum volume void 75. In this embodiment a cross member 130 may be provided that rests atop feed placed in the feedbox 120. As the feed level is decreased, the cross member 130 moves downward, thus allowing the feedbox 120 to collapse and reducing the height of the feedbox 120.

In a further embodiment depicted by FIG. 4D-FIG. 4H, the accordion-like vessel (feedbox 120) is biased so that it tends to naturally expand outward/upward along the vertical axis Y, toward a maximum volume void 75. In this embodiment, a weighted lid 410 may be provided to counter the natural expansive bias of the accordion-like vessel (feedbox 120). In this way, as the feed level within the feedbox 120 decreases, the feedbox 120 will be compressed downward in height.

FIG. 5A-FIG. 5H are diagrams depicting a further embodiment of the feeder 100 in which the feedbox 120 is implemented as a unitary vessel that can be collapsed/compressed to yield a smaller volume void 75. In this embodiment, the vessel is generally cylindrical in shape. However, the walls of the cylinder are formed by a spring-like structure or frame 525 that is covered or embedded in a layer of flexible material 530 such as, for example, rubber, plastic, fabric or other woven fibers.

Figure 5A:
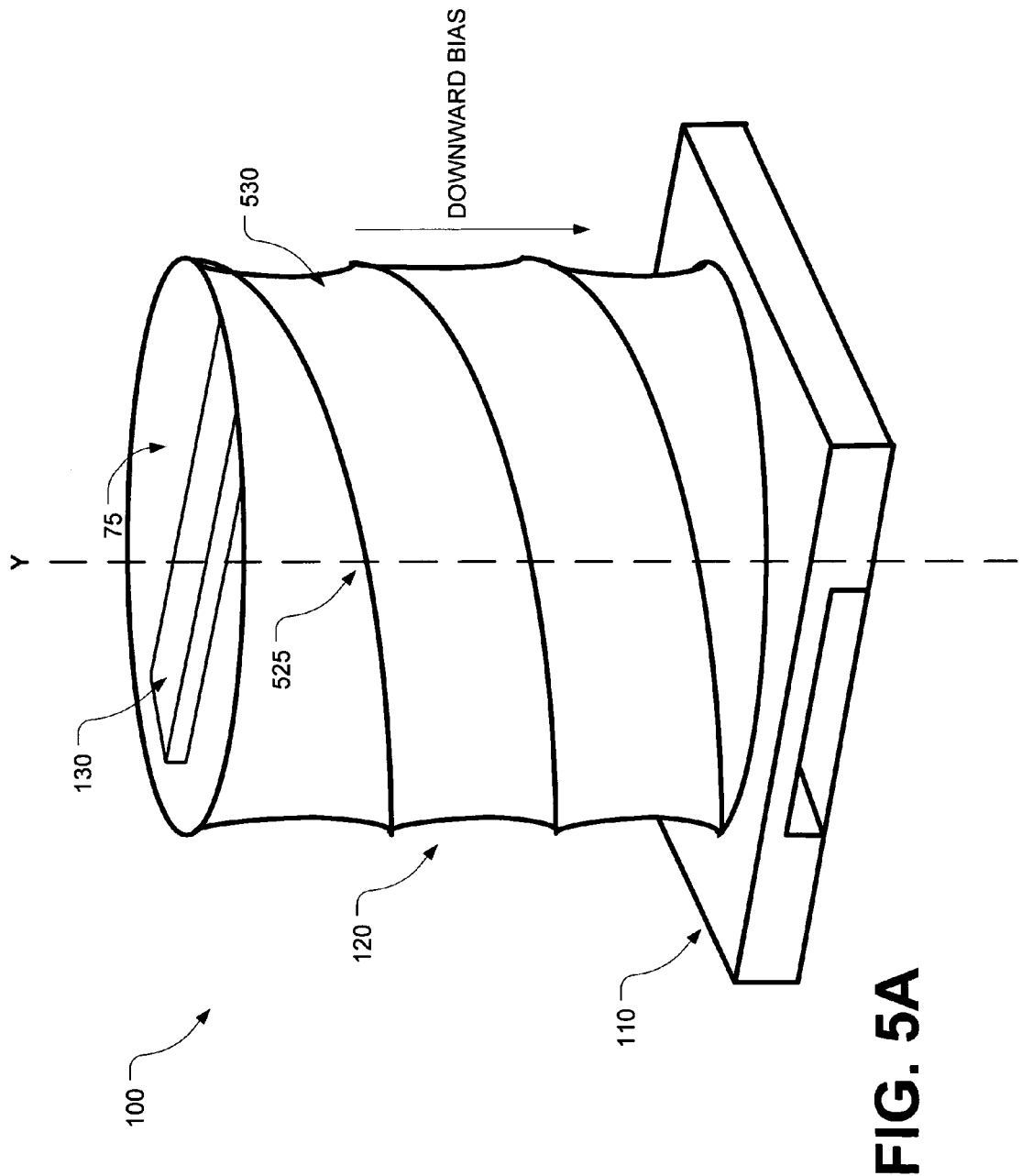
FIG. 5A-FIG. 5D are diagrams depicting a further embodiment of feedbox 120.

In one embodiment depicted by FIG. 5A, the frame 525 is biased (downward bias) so that it naturally tends to collapse/downward along the vertical axis Y, toward a minimum volume void 75. In this embodiment a cross member 130 may be provided that rests atop feed placed in the feedbox 120. As the feed level is decreased, the cross member 130 moves downward, thus allowing the feedbox 120 to collapse and reducing the height of the feedbox 120.

Figure 5B:
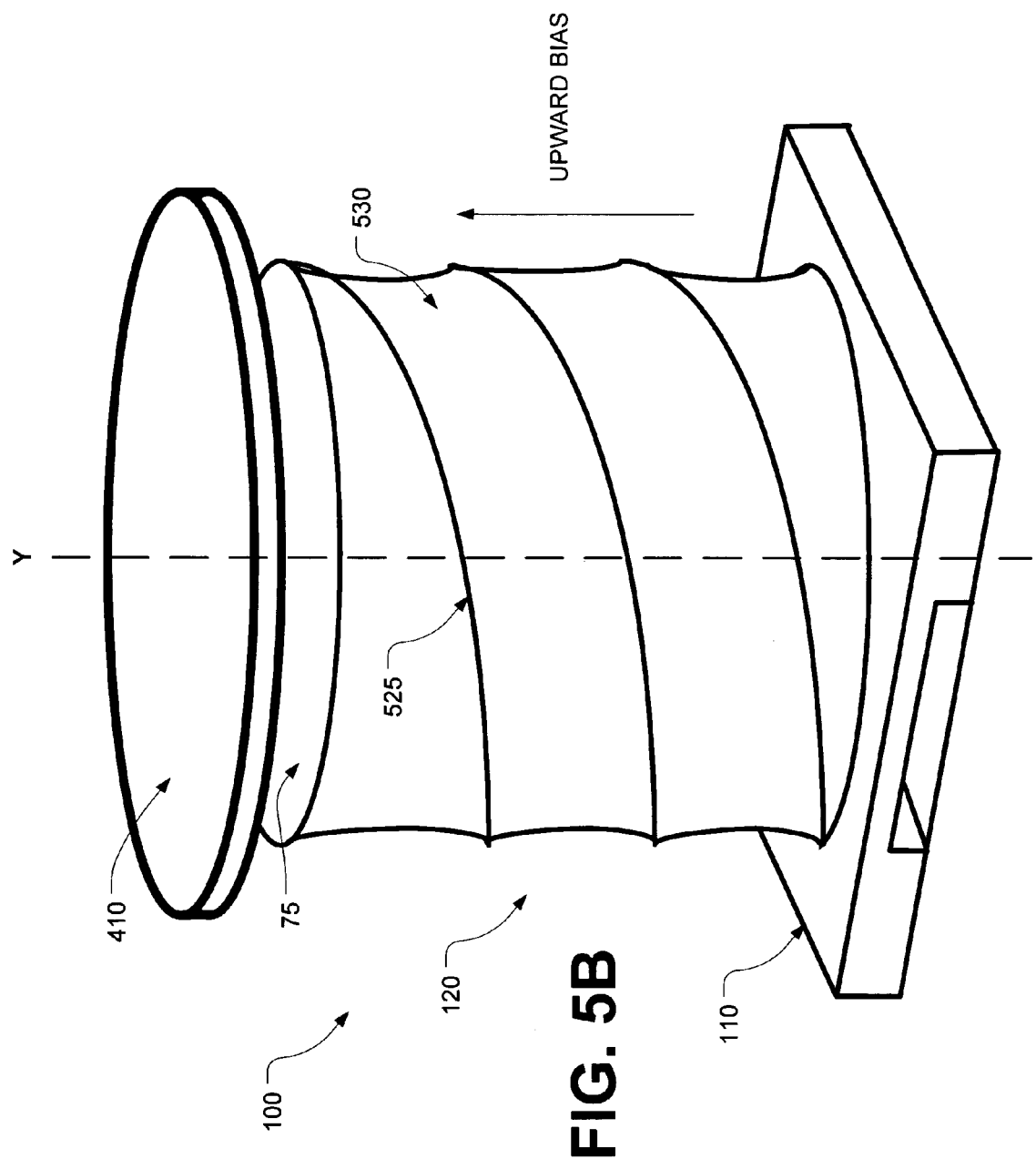
Figure 5D:
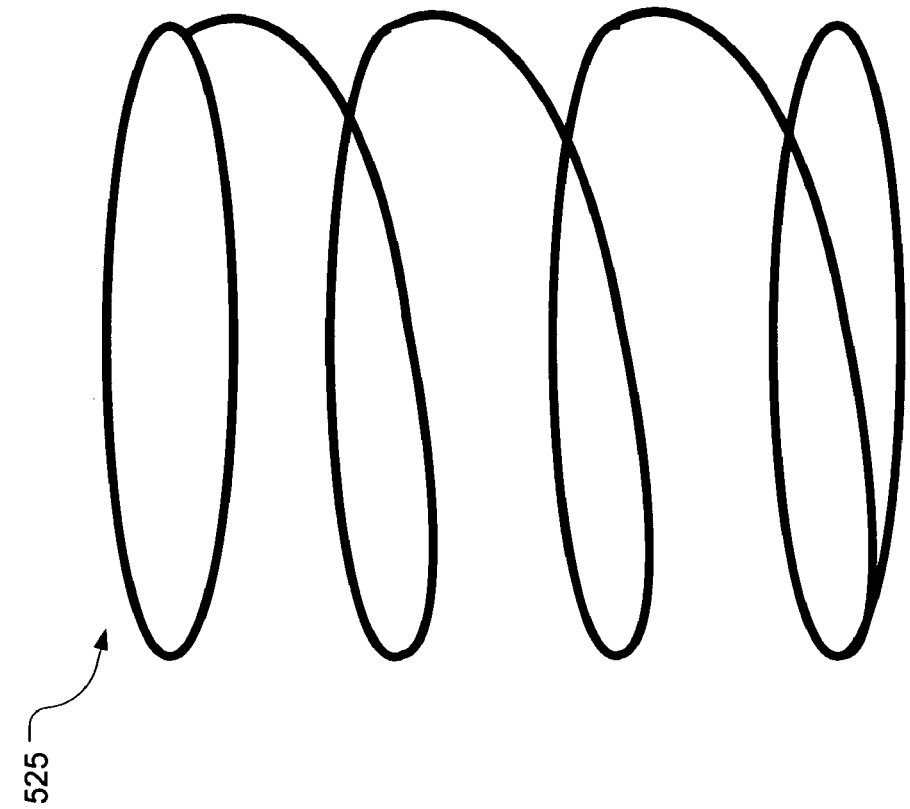
Figure 5C:
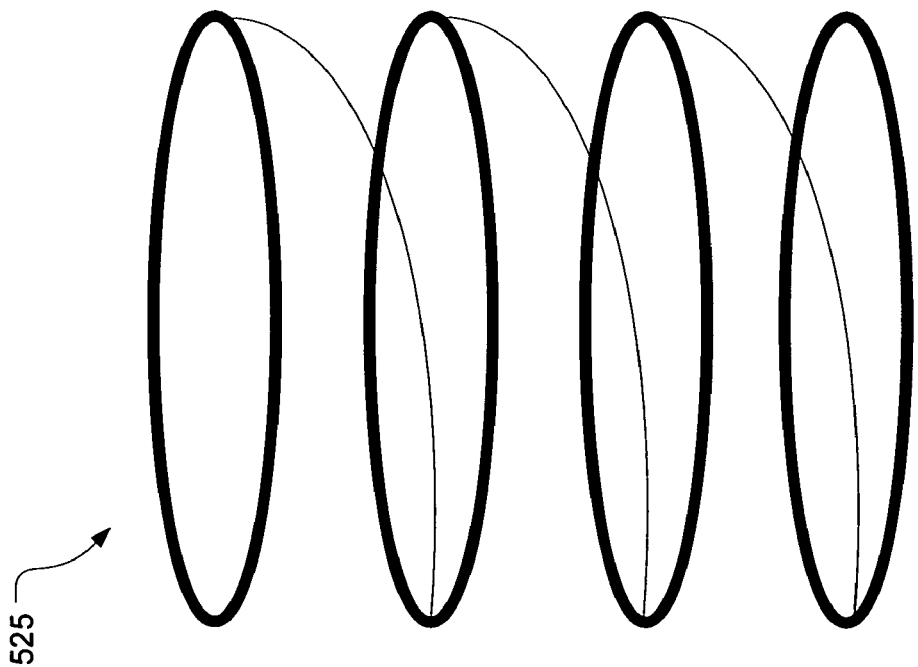

In a further embodiment depicted by FIG. 5B, the frame 525 is biased so that it tends to naturally expand outward/upward along the vertical axis Y, toward a maximum volume void 75. In this embodiment, a weighted lid 410 may be provided to counter the natural expansive bias of the frame 525. In this way, as the feed level within the feedbox 120 decreases, the feedbox 120 will be compressed downward in height. FIG. 5C and FIG. 5D are diagrams depicting possible implementations of the spring like frame 525.

Figure 6A:
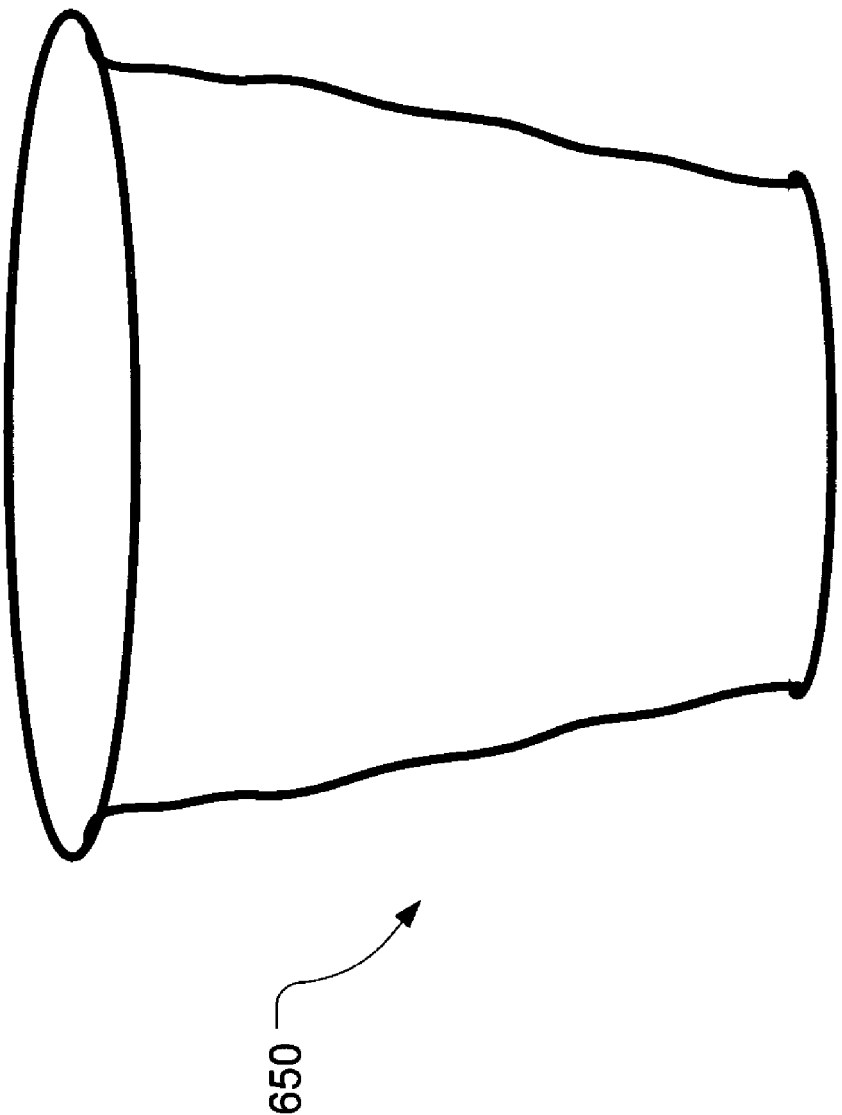
FIG. 6A-FIG. 6B are diagrams depicting a further embodiment of the feedbox 120 wherein a sleeve 650 is provided.
Figure 6B:
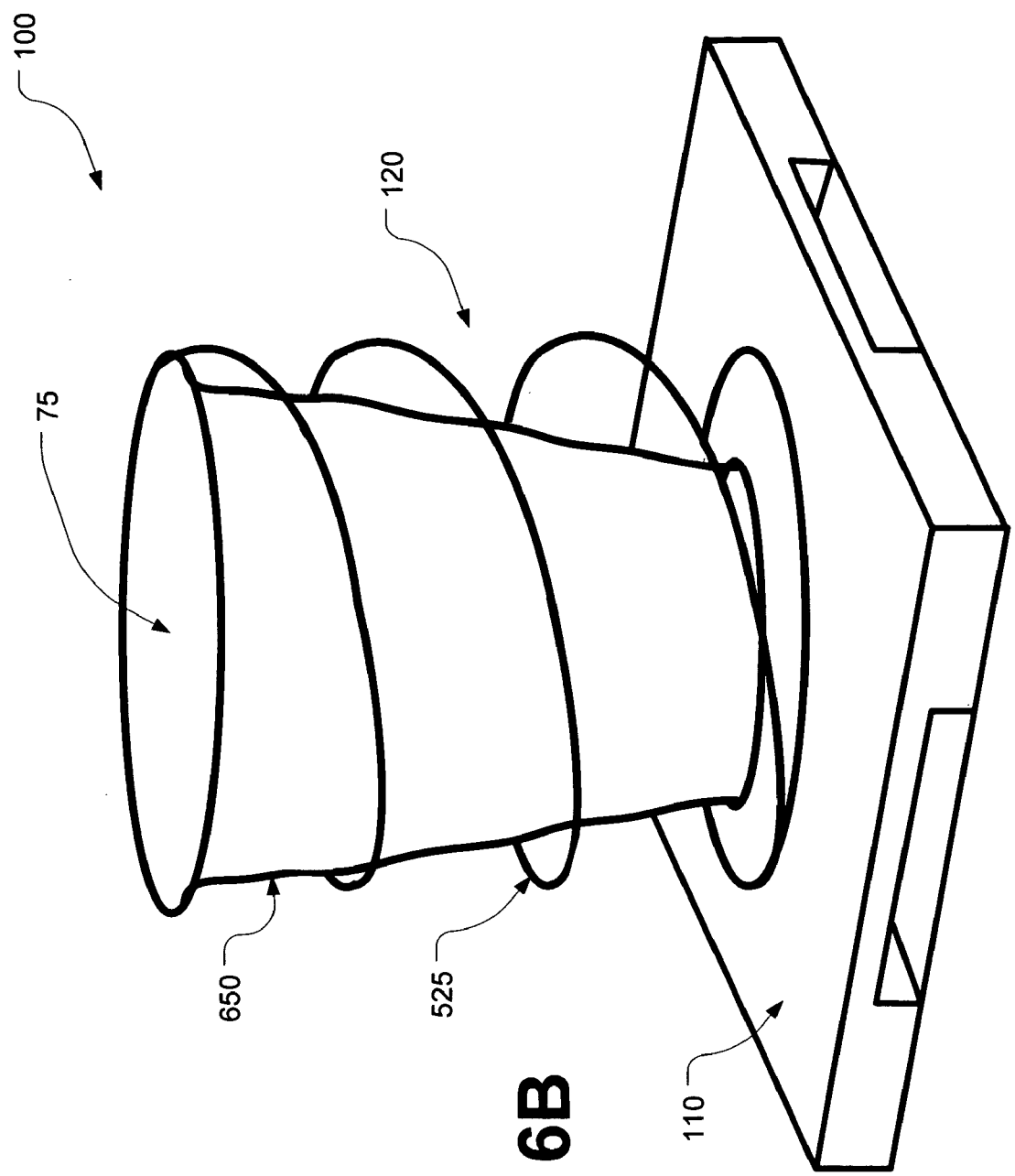

A further embodiment of the feeder 100 is depicted in FIG. 6A and FIG. 6B. In this embodiment, the feedbox 120 is implemented as a sleeve 650 that is supported and held in place by a spring-like frame 525. The frame 525 may be biased (downward bias) so that it naturally tends to collapse/downward along the vertical axis Y, toward a minimum volume void 75. In this embodiment a cross member 130 may be provided that rests atop feed placed in the feedbox 120. As the feed level is decreased, the cross member 130 moves downward, thus allowing the feedbox 120 to collapse and reducing the height of the feedbox 120. Alternatively, the frame 525 may be biased so that it tends to naturally expand outward/upward along the vertical axis Y, toward a maximum volume void 75. In this embodiment, a weighted lid 410 (not shown) may be provided to counter the natural expansive bias of the frame 525. In this way, as the feed level within the sleeve 650 (feedbox 120) decreases, the feedbox 120 will be compressed downward in height.

The sleeve 650 may be fabricated of any flexible material including, but not limited to, plastic, rubber, natural and/or synthetic fibers. Whatever material is used, it is preferable that it is strong enough to resist animal claws, teeth and antlers so that an animal attack on the feeder 100 will be less likely to split open the sleeve 650.

With all embodiments of the feeder 100 discussed above, the feeder 100 may be implemented so that the base 110 is configured to be sat on a stable surface, such as, for example the ground. Alternatively, the feeder 100 may be implemented so that the base 110 is suspended or otherwise supported at a predetermined level above ground, or other surface, by a tripod system or other support system. The feedbox 120 is preferably independent of direct connection with any type of tripod or other suspension system so that the feedbox may freely collapse as feed levels therein are depleted. Further, the feeder 100 may be configured to include a motorized spinner plate (not shown) that receives feed out from a feed outlet 115 on the base.

While the embodiments of feeder 100 discussed above show and discuss the feedbox 120 as being configured in the form of a generally cylindrical shaped vessel (i.e. a circular shaped tube-like vessel), it is also possible to implement the feedbox 120 in other shapes, such as, for example, a generally square or rectangular shaped tube-like vessel or triangular shaped tube-like vessel.

The cross member 130 acts as a physical stop to limit the collapse of the feedbox 120 below the level of feed within the feedbox. This physical stop may be provided in different ways other than the cross member, including, for example, use of a cover or lid that goes across the top opening of the feedbox and attaches to the top of the walls/bands of the feedbox 120 to cover or substantially cover the void 75 of feedbox 120.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit, principles and scope of the invention. All such modifications and variations are fully intended to be included herein within the scope of the present invention and protected by the following claims.

What is claimed:

1. An animal feeder comprising:
   A collapsible feedbox having an interior void for receiving animal feed;
   A base attached to the feedbox and configured to rest on a predetermined surface;
   The base includes a feed outlet for allowing animal feed to be output from the feedbox; and
   A physical stop is connected to the collapsible feedbox and configured to limit the collapse of the feedbox below the level of feed placed in the interior void.

2. The animal feeder of claim 1 wherein the collapsible feedbox comprises a first concentric band and a second concentric band.

3. The animal feeder of claim 2 wherein the first concentric band has an interior diameter than is greater than the interior diameter of the second band.

4. The animal feeder of claim 3 wherein the first concentric band and the second concentric band are substantially aligned along a common vertical axis.

5. The animal feeder of claim 4 wherein the first concentric band comprises a first flange along the lower edge of the first band and the second concentric band comprises a second flange along the upper edge of the second band.

6. The animal feeder of claim 5 wherein the first concentric band and the second concentric band are configured so that the first flange will engage with the second flange when the first concentric band is moved upward along the common vertical axis.

7. The animal feeder of claim 6 wherein the physical stop comprises a cross member attached to the first concentric band.

8. The animal feeder of claim 1 wherein the collapsible feedbox comprises a unitary vessel that is biased to collapse downward toward the base.

9. The animal feeder of claim 8 wherein the unitary vessel is comprised of an accordion-like wall of flexible material.

10. The animal feeder of claim 1 wherein the collapsible feedbox comprises a unitary vessel that is biased to expand upward along a vertical axis generally perpendicular to the base.

11. The animal feeder of claim 10 further comprising a cover attached to the unitary vessel to counter the upward expansion of the unitary vessel.

12. The animal feeder of claim 1 wherein the collapsible feedbox comprises a spring-like frame and a sleeve for receiving animal feed.

13. The animal feeder of claim 1 further comprising a support system for suspending the base of the feeder at a predetermined level above a predetermined surface.

14. The animal feeder of claim 1 further comprising a motorized spinner plate for broadcasting feed output from the feed outlet.

15. An animal feeder comprising:
   A collapsible feedbox having an interior void for receiving animal feed;
   The feedbox comprises a first concentric band having a first interior diameter and a second concentric band having a second interior diameter;
   The first band and the second band are generally aligned along a common vertical axis;
   the first concentric band and the second concentric band are configured to engage when the first concentric band is moved upward along the common vertical axis so as to increase the volume of the interior void;

A base is attached to the feedbox and configured to rest on a predetermined surface;

The base includes a feed outlet for allowing animal feed to be output from the feedbox; and A cross member connected near the upper edge of the first concentric band to preclude the collapse of the feedbox below the level of feed placed in the interior void.

16. An animal feeder comprising:

A collapsible feedbox having an interior void for receiving animal feed;

The feedbox comprises a unitary vessel biased to collapse downward in a manner that decreases the volume of the interior void;

A base is attached to the feedbox and configured to rest on a predetermined surface;

The base includes a feed outlet for allowing animal feed to be output from the feedbox; and A physical stop is attached near the upper edge of the unitary vessel to preclude the collapse of the feedbox below the level of feed placed in the interior void.

* * * * *